UNITED STATES PATENT OFFICE.

PETER REID, OF PASSAIC, AND JOHN EASTWOOD, OF BELLEVILLE, NEW JERSEY, ASSIGNORS TO THE CELLULOID MANUFACTURING COMPANY, OF NEW YORK, N. Y.

INK FOR DYEING PURPOSES.

SPECIFICATION forming part of Letters Patent No. 256,596, dated April 18, 1882.

Application filed March 2, 1882. (No specimens.)

*To all whom it may concern:*

Be it known that we, PETER REID, of Passaic, county of Passaic, State of New Jersey, and JOHN EASTWOOD, of Belleville, Essex county, State of New Jersey, have invented an Improved Ink for Topical Printing, of which the following is a specification.

The invention has relation to improvements in the art of applying designs, figures, colors, &c., to textile fabrics, prepared skins, paper, and other surfaces.

The distinctive novelty of the invention consists in a solution containing soluble pyroxyline for the purpose of "setting" or "fixing" the design, in connection with what is known as "topical printing," in which an impression is delivered by means of pressure or by bringing a surface having a "color" or "ink" applied to it in contact with another surface upon which the impression is intended to be made.

Varnishes or mixtures have heretofore been made by combining a coloring agent with pyroxyline, oils, &c., and a volatile spirit, which varnishes or mixtures have been applied by means of a brush to form a coating or covering for fabrics, picture-frames, &c. It has also been customary to make a bath of a volatile spirit carrying a coloring agent and a small percentage of pyroxyline in which fabrics have been immersed, the volatile spirit being afterward permitted to evaporate; but pyroxyline has not been known to possess the qualities which render it susceptible of use in fixing or setting a color or ink so as to make it available for use in the art of printing.

In practice we prepare a solution consisting of soluble pyroxyline, a solvent, and a coloring agent, employing, if necessary, a suitable menstruum—such as alcohol, wood-naphtha, &c.—the ingredients being thoroughly united to form a homogeneous compound. Any soluble pyroxyline may be employed; but we prefer to employ that form of pyroxyline known as "nitro-cellulose," although other forms which may be effectually dissolved can be employed.

We have used, with especially satisfactory results, a solution produced by subjecting a suitable fibrous material to the action of sulphuric and nitric acid, and after further treatment we add a small per cent. of camphor and alcohol or equivalent agents. We attach great importance to the use of camphor, and recommend its employment.

The solution may be made in any convenient way and adapted to perform the offices of an ink or color, according to circumstances. It should be of the proper consistency, and may be applied in the customary manner to the rollers, types, blocks, or other agents for delivering the impression, and the coloring agent may be of any kind or nature. By the terms "ink" and "color" we mean all inks and colors of every nature which are used in connection with the art of topical printing, whether the impression is to be delivered upon textile material, prepared skins, paper, or any other surfaces or material.

Having thus described our invention, what we claim as new, and desire to secure by Letters Patent, is—

An ink or color composed essentially of pyroxyline, a coloring agent, camphor, and a suitable menstruum, for the uses and purposes substantially as set forth.

In testimony whereof we have hereunto subscribed our names this 27th day of February, 1882.

PETER REID.
JOHN EASTWOOD.

Witnesses:
 CHAS. C. GILL,
 HERMAN GUSTOW.